UNITED STATES PATENT OFFICE.

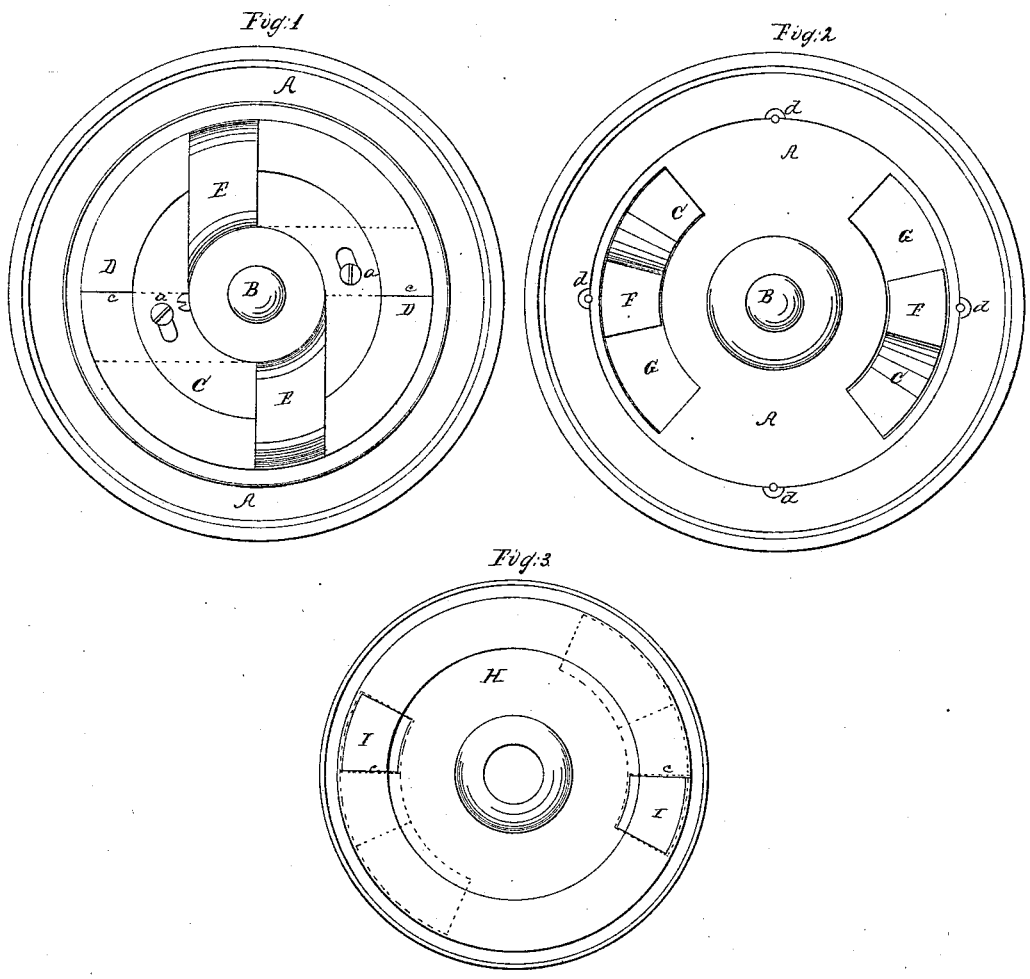

ELISHA O. POTTER, OF PAWTUCKET, RHODE ISLAND.

IMPROVEMENT IN SHAFT-COUPLINGS OR CLUTCH-PULLEYS.

Specification forming part of Letters Patent No. 51,619, dated December 19, 1865.

*To all whom it may concern:*

Be it known that I, ELISHA O. POTTER, of Pawtucket, in the county of Providence and State of Rhode Island, have invented certain new and useful Improvements in Clutches for the Shafting of Machinery, of which the following is a full, clear, and exact description, reference being had to the accompanying drawings, making part of this specification, in which—

Figure 1 is a plan view of a pulley having my improved clutch applied thereto. Fig. 2 is a plan of the opposite side of the pulley, with its cover or disk removed to show the interior construction, and Fig. 3 is a modification of the same.

The ordinary positive coupling-clutch has been found objectionable, on account of the sudden jar or concussion given by it to the machinery in starting, whereby it is frequently broken. The belt is also liable to slip upon the pulley and become rapidly worn by use.

To overcome these objections various descriptions of friction pulleys and clutches have been employed, but they have proved to be complicated and expensive, and require constant adjustment.

The object of my invention is to avoid these difficulties; and it consists in the introduction of a spring or springs within the positive part of the clutch or the pulley that carries the band, in such a manner as to relieve the parts of the jar or concussion incident upon the sudden engagement of one part of the clutch with the other. It also tends to a more easy and regular motion of the machinery carried by the band.

To enable others skilled in the art to make and use my invention, I will proceed to describe its construction and operation.

In the accompanying drawings, A represents a pulley-wheel, which runs upon the shaft B. Upon one side of this pulley is fitted a circular plate or disk, C, which is secured in place by screws $a$ passing through slots $b$ in the disk into the pulley A.

The disk C is provided on its exterior face with a projecting rim, which is cut away so as to form two inclines, D, Fig. 1, each of which rises gradually from the face of the disk to a shoulder, thus forming one portion of the clutch, which engages with the arms E permanently secured to the shaft B, and forms the opposite portion of the clutch.

On the inner side of the disk, and forming a part of the same, are two dogs or projections, F, Fig. 2, placed opposite to each other and fitting in curved slots in the body of the pulley A. Within these slots are also fitted springs of vulcanized india-rubber, G, or any other suitable material, against which the ends of the dogs or projections are made to bear, so that as the loose pulley is moved upon the shaft B, by a shipper-lever or otherwise, to bring the shoulders on the outer face of the disk C into contact with the arms E of the positive clutch, the disk C will be moved within the pulley, thus causing the dogs to bear against and compress the springs G, and in a measure gradually imparting the motion of the disk to the pulley without producing the sudden jerk or concussion on the machinery usual with positive clutches.

A plate or cover is made to fit over the opposite side of the pulley A, where it is secured by screws, and serves to protect the springs and interior of the pulley from oil and dust. The springs, being placed opposite to the points of contact of the two parts of the clutch, tend to give the pulley an even bearing upon the shaft, preventing it from turning or binding.

Instead of the rubber springs G above described, spiral or other springs may be employed, and instead of applying them within the pulley, as shown, they may be applied to the projecting rim D on the exterior face of the disk C, or their position otherwise varied, as may be desirable.

In lieu of the pulley A, running loosely on the shaft, and working in connection with a clutch, E, permanently secured thereto, as above described, a pulley, H, Fig. 3, of similar construction to the pulley A, may be permanently secured to the shaft, the other portion of the clutch being made to run loosely on the shaft. This, however, is simply a modification of the method described.

Instead of the projecting rim and shoulders on the face of the disk C, a system of gearing may be used.

Having thus described my invention, what I claim as my improvement, and desire to secure by Letters Patent, is—

1. The introduction of a spring or springs in the pulley or clutch for the purpose of relieving the jar or concussion when one portion of the clutch is brought in contact with the other portion, substantially as and for the purpose set forth.

2. The disk C, with its inclines D and dogs F, in combination with the pulley A and springs G, substantially as described.

ELISHA O. POTTER.

Witnesses:
DANIEL F. FITZ,
GEORGE C. FITZ.